United States Patent [19]

Tsukamoto

[11] Patent Number: 4,506,845
[45] Date of Patent: Mar. 26, 1985

[54] TENSION LOCKING MECHANISM OF A RETRACTOR

[75] Inventor: Masahiro Tsukamoto, Fujisawa, Japan

[73] Assignee: NSK-Warner K.K., Tokyo, Japan

[21] Appl. No.: 578,558

[22] Filed: Feb. 9, 1984

[30] Foreign Application Priority Data

Feb. 14, 1983 [JP] Japan .............................. 58-18986[U]

[51] Int. Cl.³ ........................ A62B 35/00; B65H 75/48
[52] U.S. Cl. .................................................. 242/107.7
[58] Field of Search ............. 242/107.7, 107.6, 107.12; 280/806, 807, 808, 803; 297/475–478

[56] References Cited

U.S. PATENT DOCUMENTS

| 3,834,646 | 9/1974 | Heath | 242/107.7 |
| 3,869,098 | 3/1975 | Sprecher | 242/107.4 A |
| 4,023,746 | 5/1977 | Magyar | 242/107.7 |
| 4,065,072 | 12/1977 | Magyar | 242/107.7 |
| 4,108,395 | 8/1978 | Heath | 242/107.7 |
| 4,270,709 | 6/1981 | Inukai | 242/107.7 |

Primary Examiner—John M. Jillions
Attorney, Agent, or Firm—Shapiro and Shapiro

[57] ABSTRACT

In a retractor having a seat occupant restraining belt rolling-up reel rotatably supported on a base and a member for biasing the reel in a belt rolling-up direction, a tension locking mechanism has a mechanism including a pawl, a portion for engaging with the pawl to block the rotation of the reel in the belt rolling-up direction, the portion being integral with the reel, and two cam members comprising portion for bringing the integral portion and the pawl into an engageable state after a series of predetermined belt operations from a state in which the whole amount of the belt has been rolled up, portions for once bringing the pawl and the integral portion into an unengageable state from the engageable state within a belt draw-out range less than a predetermined amount, but returning the pawl and the integral portion into the engageable state when a draw-out force is again eliminated, and a portion for realizing the unengageable state by the draw-out of the belt more than the predetermined amount and bringing about a position for rolling up the whole amount of the belt.

7 Claims, 9 Drawing Figures

TENSION LOCKING MECHANISM OF A RETRACTOR

BACKGROUND OF THE INVENTION

1. Field of the Invention

This invention relates to a retractor for a seat belt with a tension locking mechanism for locking the belt take-up force during the belt wearing, and more particularly to a tension locking mechanism including two cam plates for controlling a pawl.

2. Description of the Prior Art

Various tension locking mechanisms of this type have heretofore been proposed, but many of them have room for improvement in respect of the number of parts, the complexity of the shape of each member and the flexibility of designing.

SUMMARY OF THE INVENTION

It is therefore an object of the present invention to provide a tension locking mechanism which is excellent in these points.

The invention will become fully apparent from the following detailed description thereof taken in conjunction with the accompanying drawings.

DESCRIPTION OF THE PREFERRED EMBODIMENT

Figure 1:
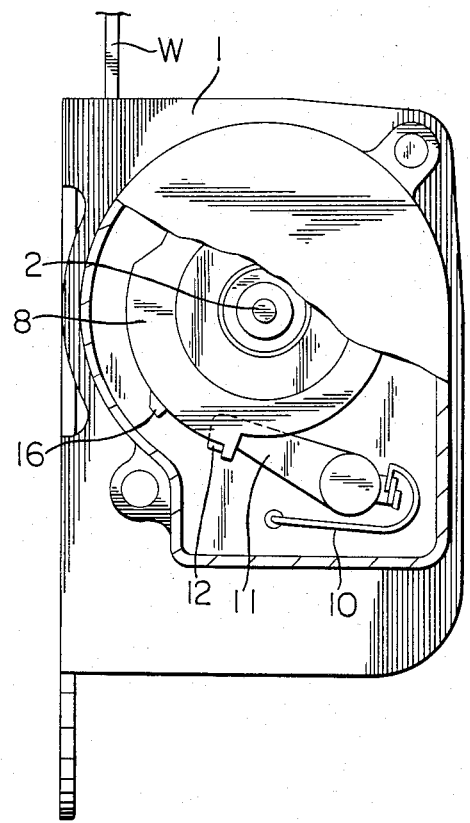
FIG. 1 is a partly cut-away front view of an embodiment of the present invention.
Figure 2:
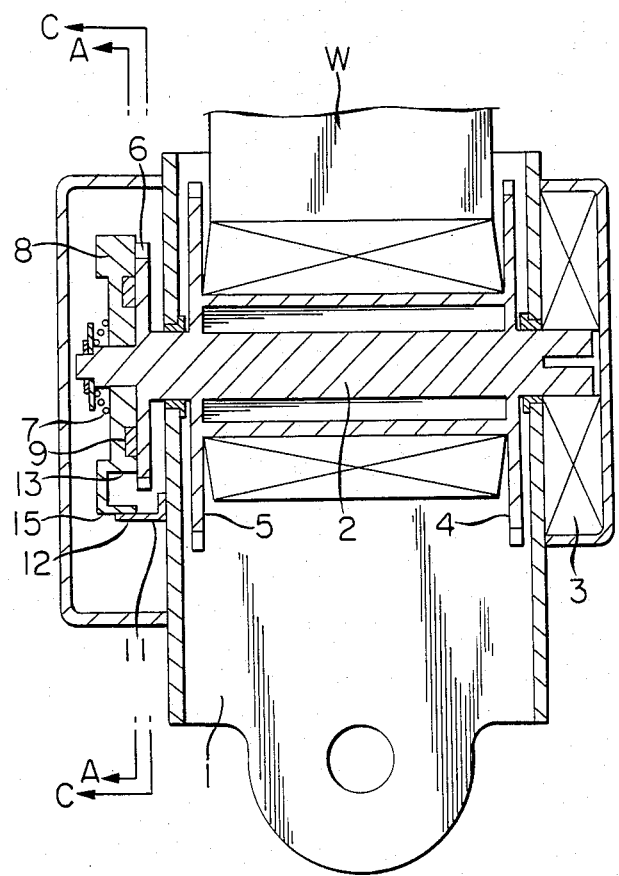
FIG. 2 is a cross-sectional view of the embodiment.

Referring to FIGS. 1 and 2 of the drawings, a take-up reel 2 to which the inner end of a belt W is secured is rotatably supported on a base 1, and the reel 2 is biased in a belt take-up direction (a counter-clockwise direction as viewed in FIG. 1) by a take-up spring 3. Inside the base 1 and near the opposite ends of the reel 2, large ratchet wheels 4 and 5 having their engaging surfaces facing in a belt draw-out direction are formed integrally with each other, and these ratchet wheels mesh with a stopper, not shown, to prevent the rotation of the reel 2 in the draw-out direction and restrain the belt wearer safely when an acceleration sensing mechanism, not shown, senses for example a predetermined speed change of a vehicle.

A small ratchet wheel 6 having its engaging surface facing in the belt take-up direction is integrally attached to the outermost end portion of the reel 2 opposite to that end of the reel to which the take-up spring 3 is attached, and a first cam member 8 urged against the outer surface of the ratchet wheel 6 by a spring 7 is rotatably supported on the outer side of the ratchet wheel 6. Accordingly, the first cam member 8 is in a frictional engagement with the ratchet wheel 6 and thereby tends to rotate with the ratchet wheel 6, namely, with the reel 2. The inner side surface of the first cam member 8 is formed with a groove in which is disposed a second cam member 9 having a thickness somewhat smaller than the depth of the groove. Accordingly, the second cam member 9 tends to rotate with the first cam member 8 due to its frictional action.

Figure 3:
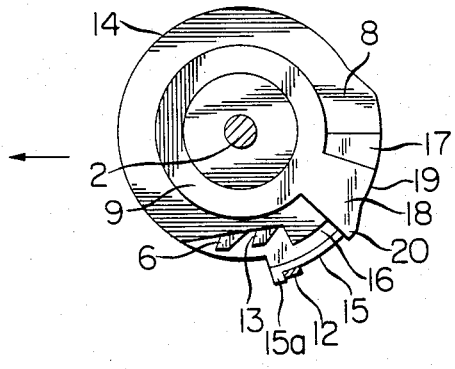
FIG. 3 is a cross-sectional view taken along line A—A of FIG. 2.

The first cam member 8 has a shape as shown in FIG. 2 and FIG. 3 which is a cross-sectional view taken along line A—A of FIG. 2, and has various cam surfaces for controlling a pawl 11 rockably mounted on the base 1 and biased by a spring 10 in a direction to mesh with the ratchet wheel 6. These cam surfaces are a first cam surface 13 for engaging with the projected portion 12 of the pawl 11 to make the pawl 11 capable of meshing with the ratchet wheel 6, a second cam surface 14 continuous from the first cam surface 13 and making the pawl 11 incapable of meshing with the ratchet wheel 6, a third cam surface 15 circumferentially spaced apart from the second cam surface 14 and lying radially outwardly of the first cam surface 13 and further having a projection 15a for restraining the projected portion 12 of the pawl 11, and a fourth cam surface 16 lying radially inwardly of the third cam surface 15 connected to the first cam surface 13 and keeping the pawl 11 in a provisional position in which provisionally it is not capable of meshing with the ratchet wheel 6.

The groove in which the second cam member 9 is fitted comprises an annular portion and a radially outwardly extending portion 17 and correspondingly thereto, the second cam member 9 has an annular portion and a protruded portion 18 which is narrower in width than the portion 17 of the groove and accordingly, the second cam member 9 can rotate relative to the first cam member 8 within the range in which the protruded portion 18 strikes against the opposite sides of the portion 17. The protruded portion 18 has a cam surface 19 continuous from the second cam surface 14 of the first cam member 8, and that side of this cam surface 19 which is adjacent to the third cam surface 15 of the first cam member 8 provides a projection 20. This projection 20 gradually rises from the cam surface 19 and sharply falls radially inwardly on the third cam surface side. The fourth cam surface 16 of the first cam member 8 extends also toward the portion 17 of the groove so as to receive the projected portion 12 of the pawl 11 when the projected portion 12 falls from the third cam surface 15 through a gap made between the third cam surface 15 and the projection 20.

Operation of the present embodiment will now be described on the basis of the above-described construction.

Figure 4:
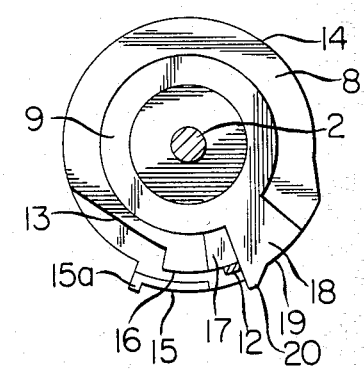
FIGS. 4 to 9 illustrate the operation of the embodiment, FIG. 6 being a cross-sectional view taken along line C—C of FIG. 2.

The stand-by condition in which the whole amount of the belt W has been rolled up is shown in FIG. 4. In this condition, the second cam member 9 is in a state in which the protruded portion 18 is pushed by the projected portion 12 of the pawl 11 and strikes against that side of the portion 17 of the groove of the first cam member 8 which is adjacent to the second cam surface 14, and the rotation of the cam members 8 and 9 in the rewind direction, i.e., in the clockwise direction as viewed in FIG. 4, is blocked by the projected portion 12 of the pawl 11 which is received in the fourth cam surface 16.

As the belt W is drawn out from the state of FIG. 4 in order for the seat occupant to wear the belt, the first cam member 8 begins to rotate counter-clockwisely with the reel 2 and the projected portion 12 of the pawl 11 follows the fourth cam surface 16, the first cam surface 13 and the second cam surface 14 in succession. At this time, the second cam member 9 begins to rotate counter-clockwisely with the first cam member 8 due to its friction with the latter. Thus, the projected portion 12 of the pawl 11 comes to the inclined surface of the projection 20 via the cam surface 19 of the second cam member 9 (FIG. 7), whereupon it imparts a clockwise force to the second cam member 9 to rotate the second cam member clockwisely relative to the first cam member 8 (FIG. 8), whereafter the projected portion 12 goes over the projection 20 and comes to the third cam surface 15 of the first cam member 8 and finally becomes engaged with the projection 15a, as shown in FIG. 3. In this state, even if the belt is still drawn out, only the reel 2 rotates counter-clockwisely and the cam members 8, 9 and the pawl 11 remain unchanged.

When the belt wearer latches the buckle, for example, and then leans against the back of the seat to assume a regular seated position, the belt is somewhat rewound. Thereupon, the first cam member 8 rotates clockwisely with the reel 2, namely, the ratchet wheel 6 and the second cam member 9 also rotates clockwisely with the first cam member 8. However, when the projected portion 12 of the pawl 11 counter-clockwisely follows the third cam surface 15 of the first cam member 8 and bears against the sharply falling surface of the projection 20 of the second cam member 9, the second cam member 9 is subjected to a counter-clockwise force and is thereby rotated counter-clockwisely relative to the first cam member 8, whereby the path from the third cam surface 15 to the fourth cam surface 16 is opened and the projected portion 12 falls onto the fourth cam surface 16. Thus, the state of FIG. 4 is restored.

Figure 6:
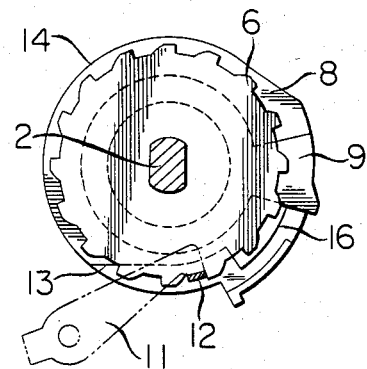

Next, when the belt is somewhat drawn out to provide some slack in the belt wearing, the first cam member 8 rotates counter-clockwisely with the reel 2 while dragging the second cam member 9, and the projected portion 12 of the pawl 11 falls from the fourth cam surface 16 onto the first cam surface 13, as shown in FIG. 6, and comes into mesh engagement with the ratchet wheel 6, thereby locking the rotation of the reel 2 in the rewind direction, i.e., the clockwise direction. Accordingly, the force of the take-up spring 3 is not applied to the belt wearer, who can thus enjoy comfortable belt wearing without a sense of oppression.

Figure 7:
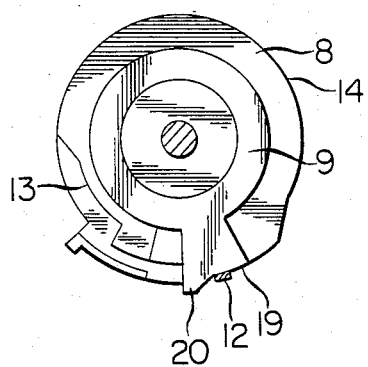

It is possible to draw out the belt W from the state of FIG. 6 and as the belt is drawn out, the projected portion 12 of the pawl 11 shifts from the first cam surface 13 to the second cam surface 14 and further to the cam surface 19 of the second cam member 9, whereupon the pawl 11 becomes incapable of meshing with the ratchet wheel 6 and the force of the take-up spring 3 is recovered. Accordingly, if the belt draw-out force is eliminated at this stage, the belt W is again taken up to restore the state of FIG. 6. That is, as shown in FIG. 7, as long as the projected portion 12 of the pawl 11 stops this side of the projection 20 of the second cam member 9, the original belt wearing condition is restored if the belt draw-out force is eliminated and thus, the belt wearer is permitted to move such as forward leaning movement within such predetermined range.

Figure 5:
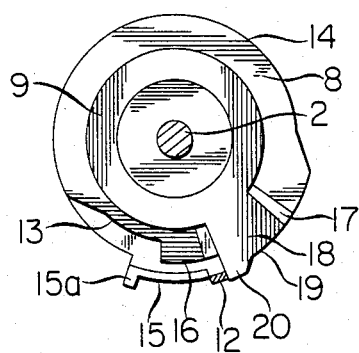
Figure 8:
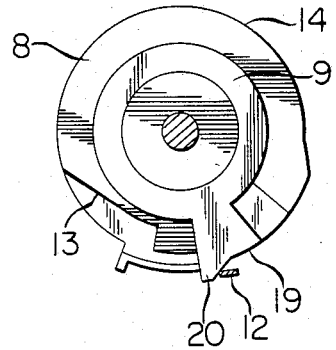
Figure 9:
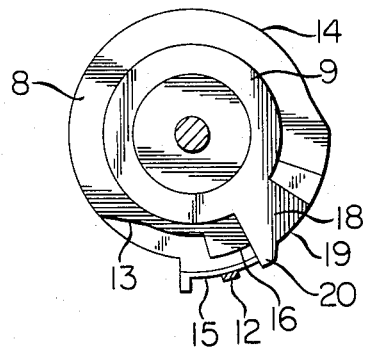

However, when the belt is drawn out via the state of FIG. 8 until, as shown in FIG. 9, the projected portion 12 of the pawl 11 comes to the third cam surface 15 of the first cam member 8 beyond the projection 20 of the second cam member 9, the state of FIG. 6 can no longer be restored and, if the draw-out force is eliminated at this point, the state of FIG. 4 is reached via the state of FIG. 5 and a position for rolling up the whole amount of the belt is assumed. Accordingly, if the belt wearer releases the buckle, for example, and draws out the belt to such an extent that the state of FIG. 9 can be realized, the whole amount of the belt W is rolled up into the retractor by the belt wearer's releasing the belt. Thus, the state of FIG. 4 is reached and the next belt draw-out is waited for.

With the above-described construction of the present embodiment, when the belt is to be worn, the amount of rewind (FIG. 3→FIG. 5) after the belt has been drawn out is small and the state of FIG. 6 in which the tension locking is possible can be realized, because the length of the third cam surface 15 of the first cam member 8 which determines the amount of rewind can be flexibly determined.

According to the present invention, as described above, the pawl is suitably controlled by two cam members and thereby a tension locking action is realized and therefore, a tension locking mechanism of relatively simple structure can be made with flexibility of designing.

I claim:

1. In a retractor having a seat occupant restraining belt rolling-up reel rotatably supported on a base, a member for biasing said reel in a belt rolling-up direction and a tension locking mechanism, the mechanism comprising:

a locking portion integral with said reel so as to rotate with said reel;

an engaging member mounted on said base for movement between a locking position in which the engaging member is in engagement with said locking portion so as to prevent the reel rotation in the belt rolling-up direction and a non-locking position in which the engaging member is out of engagement with said locking portion so as to permit the belt rolling-up reel rotation, said engaging member having a follower portion;

means for biasing said engaging member to the locking position;

a first cam member rotatable with said reel and having a first portion for keeping said engaging member in the locking position under a force of said biasing means during engagement between the first portion and said follower portion, a second portion for bringing said engaging member to the non-locking position from the locking position by engagement between the second portion and said follower portion when said reel rotates in a belt drawing-out direction, a third portion for holding said engaging member in the non-locking position during engagement between the third portion and said follower portion when said reel rotates in the belt drawing-out direction over a predetermined amount from a condition in which said follower portion engages with the first portion and a path for guiding said follower portion from the third portion toward the first portion; and a second cam member rotatable with said first cam member and adapted to be rotatable with respect to said first cam member between a first position opening said path and a second position closing said path, said second cam member having a guide portion for guiding said follower portion from said second portion to said third portion, means for engagement with said follower portion to bring the second cam member to the second position so as to guide the follower portion from said second portion to said third portion through the guide portion when the reel rotates in the belt drawing-out direction and means for engagement with said follower portion to bring the second cam member to the first position so as to guide the follower portion from said third portion toward said first portion through said path when the reel rotates in the belt rolling-up direction in a condition in which said follower portion engages with said third portion.

2. A mechanism according to claim 1, wherein said first cam member further includes a fourth portion for holding said engaging member in the non-locking position during engagement between said fourth portion and said follower portion when said follower portion is guided from said third portion through said path, said follower portion is brought to said first portion when said reel rotates in the belt drawing-out direction from a condition in which said follower portion engages with the fourth portion.

3. A mechanism according to claim 1, said third portion is provided with means for restraining said follower portion during said reel rotation in the belt drawing-out direction over said predetermined amount while said first cam member is stopped rotating with said reel.

4. A mechanism according to claim 1, said first cam member is rotatable with said reel by a frictional engagement between the first cam member and the reel.

5. A mechanism according to claim 1, said second cam member is rotatable with said first cam member by a frictional engagement between the first cam member and the second cam member.

6. A mechanism according to claim 1, said locking portion is a ratchet wheel.

7. A mechanism according to claim 1, said engaging member is a pawl rockably mounted on the base.

* * * * *